(12) United States Patent
Tkachev et al.

(10) Patent No.: US 11,500,729 B2
(45) Date of Patent: Nov. 15, 2022

(54) SYSTEM AND METHOD FOR PRESERVING DATA USING REPLICATION AND BLOCKCHAIN NOTARIZATION

(71) Applicant: Acronis International GmbH, Schaffhausen (CH)

(72) Inventors: Igor Tkachev, Moscow (RU); Vladimir Miroshkin, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 316 days.

(21) Appl. No.: 16/823,914

(22) Filed: Mar. 19, 2020

(65) Prior Publication Data

US 2020/0310917 A1 Oct. 1, 2020

Related U.S. Application Data

(60) Provisional application No. 62/823,741, filed on Mar. 26, 2019.

(51) Int. Cl.
| | |
|---|---|
| *G06F 11/10* | (2006.01) |
| *G06F 11/14* | (2006.01) |
| *H04L 9/32* | (2006.01) |
| *H04L 67/1095* | (2022.01) |
| *G06F 16/27* | (2019.01) |
| *H04L 9/00* | (2022.01) |

(52) U.S. Cl.
CPC .......... *G06F 11/1451* (2013.01); *G06F 16/27* (2019.01); *H04L 9/3236* (2013.01); *H04L 9/3263* (2013.01); *H04L 67/1095* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2009/0043819 A1* | 2/2009 | Searl | G06Q 10/00 |
| 2014/0012767 A1* | 1/2014 | Schmidt | G06Q 50/18 |
| | | | 705/311 |
| 2017/0329980 A1* | 11/2017 | Hu | H04L 63/04 |
| 2021/0021426 A1* | 1/2021 | Scherrer | H04L 63/123 |

* cited by examiner

*Primary Examiner* — Belix M Ortiz Ditren
(74) *Attorney, Agent, or Firm* — ArentFox Schiff LLP; Michael Fainberg

(57) ABSTRACT

Disclosed herein are systems and methods for preserving data using a replication and blockchain notarization. In one aspect, an exemplary method comprises, by a hardware processor, receiving, from a user, a request for a legal hold of data and criteria for controlling access to the data, creating a legal hold object and establishing an access control criteria, creating, in the cloud storage, a cloud storage space that corresponds to the created legal hold object, and defining the access control for reading from the created cloud storage space, searching, in a backup data storage of a client data system, to identify all relevant data corresponding to the created legal hold object, and storing the identified relevant data and the search queries used for the identification of the relevant data, replicating the identified relevant data in the created cloud storage space, and notarizing the replicated relevant data using a blockchain notarization service.

21 Claims, 5 Drawing Sheets

SYSTEM AND METHOD FOR PRESERVING DATA USING REPLICATION AND BLOCKCHAIN NOTARIZATION

CROSS-REFERENCE TO RELATED APPLICATIONS

This application claims the benefit of U.S. Provisional Application No. 62/823,741, filed Mar. 26, 2019, which is herein incorporated by reference.

FIELD OF TECHNOLOGY

The present disclosure relates to the field of preserving data, more specifically, to a method and system for preserving data using replication and blockchain notarization, while guaranteeing that a copy of the data which is under legal hold cannot be destroyed by persons with physical access to an on-premises copy of the data, and the copy of the data remains identical to the original data after being stored.

BACKGROUND

At present, companies comply with legal hold and eDiscovery procedures in various legal proceedings. However, the process is complicated and involves identification, collection and preservation of data associated with the legal hold.

One approach to comply with legal hold requirements is to use a manual procedure for the identification, collection and preserving of the data associated with the legal hold. However, the manual procedures are prone to errors. Often the risk of court sanctions is considered high.

Another approach is available for companies that have an eDiscovery software. When the eDiscovery software solution is available, the procedures for searching for the data, processing the data, reviewing the data, collecting and preservation the data are simplified—when compared against the manual procedures. However, the simplification comes at a great cost in terms of guaranteeing accuracy. There is no built-in method to guarantee that the data originally found and preserved during the eDiscovery has not been modified or subjected to other forms of spoliation or manipulation, especially by internal parties with access. When the data associated with the legal hold and eDiscovery is not successfully preserved, serious legal consequences follow.

Hence, there is a need for an effective and efficient way of preserving data that is under legal hold.

SUMMARY

Aspects of the disclosure relate to the field of data preservation, more specifically to systems and methods for preserving data using replication and blockchain notarization.

In one exemplary aspect, a method is implemented in a computer comprising a hardware processor, the method comprising: receiving, from a user, a request for a legal hold of data and criteria for controlling access to the data, creating a legal hold object for the data and establishing an access control criteria, creating, in the cloud storage, a cloud storage space that corresponds to the created legal hold object, and defining the access control for reading from the created cloud storage space in accordance with the established access control criteria, searching, in a backup data storage of a client data system, to identify all relevant data corresponding to the created legal hold object, and storing the identified relevant data and the search queries used for the identification of the relevant data, replicating the identified relevant data in the created cloud storage space, and notarizing the replicated relevant data using a blockchain notarization service.

According to one aspect of the disclosure, a system is provided for preserving data using a replication and blockchain notarization, the system comprising a hardware processor configured to: receive, from a user, a request for a legal hold of data and criteria for controlling access to the data, create a legal hold object for the data and establish an access control criteria, create, in the cloud storage, a cloud storage space that corresponds to the created legal hold object, and define the access control for reading from the created cloud storage space in accordance with the established access control criteria, search, in a backup data storage of a client data system, to identify all relevant data corresponding to the created legal hold object, and store the identified relevant data and the search queries used for the identification of the relevant data, replicate the identified relevant data in the created cloud storage space, and notarize the replicated relevant data using a blockchain notarization service.

In one exemplary aspect, a non-transitory computer-readable medium is provided storing a set of instructions thereon for preserving data using a replication and blockchain notarization, wherein the set of instructions comprises instructions for: receiving, from a user, a request for a legal hold of data and criteria for controlling access to the data, creating a legal hold object for the data and establishing an access control criteria, creating, in the cloud storage, a cloud storage space that corresponds to the created legal hold object, and defining the access control for reading from the created cloud storage space in accordance with the established access control criteria, searching, in a backup data storage of a client data system, to identify all relevant data corresponding to the created legal hold object, and storing the identified relevant data and the search queries used for the identification of the relevant data, replicating the identified relevant data in the created cloud storage space, and notarizing the replicated relevant data using a blockchain notarization service.

In one aspect, the notarized relevant data is read from the created cloud storage space by one or more users in accordance with the defined access control, and the blockchain notarization service is used to verify an integrity of the data read from the created cloud storage space.

In one aspect, the blockchain notarization service is further used to transmit a notarization certificate to a predefined list of recipients of a copy of the relevant data, wherein the transmission of the notarization certificate being in compliance with the defined access control.

In one aspect, the notarization certificate is issued for each data item, separately.

In one aspect, the identified relevant data, after being replicated and notarized, is retained in the created cloud storage space for a duration of the legal hold.

In one aspect, the notarization of the replicated relevant data occurs automatically upon the replication of the identified relevant data in the created cloud storage space.

In one aspect, the method further comprises: determining when new data is stored in the backup data storage, using the stored search query to determine whether the new data is relevant to the created legal hold object, when the new data is determined as being relevant for the legal hold object, replicating the new data that is relevant in the created cloud storage space, and notarizing the new data that is relevant using the blockchain notarization service.

The preservation of data using replication and blockchain notarization in accordance with the teachings of the present disclosure reduces mistakes in legal hold and discovery procedures—thereby reducing the chance of legal consequences and/or court sanctions. The improvement is achieved by: receiving, from a user, a request for a legal hold of data and criteria for controlling access to the data, creating a legal hold object for the data and establishing an access control criteria, creating, in the cloud storage, a cloud storage space that corresponds to the created legal hold object, and defining the access control for reading from the created cloud storage space in accordance with the established access control criteria, searching, in a backup data storage of a client data system, to identify all relevant data corresponding to the created legal hold object, and storing the identified relevant data and the search queries used for the identification of the relevant data, replicating the identified relevant data in the created cloud storage space, and notarizing the replicated relevant data using a blockchain notarization service.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for preserving data using replication and blockchain notarization. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to present the teachings of the present disclosure with clarity, a number of terms and concepts, as used in describing various aspects of the disclosure, are defined herein.

eDiscovery refers to a discovery in a legal proceeding that applies to data stored in an electronic format.

Legal hold refers to a part of the eDiscovery. The "legal hold" is used to describe the legal process that requires a company to locate (find) and preserve all relevant information when litigation is reasonably anticipated. The legal hold is maintained for a duration of the litigation proceedings.

Backup archive refers to one or more files that contain completed backup data.

Search refers to a method of finding the relation information (data). The search may be conducted on the backup archives via keywords and/or indexed metadata.

Replication refers to copying a backup archive or files of the backup archive into another backup archive stored at another location.

Blockchain notarization refers to a process of computing (calculating) a hash function of a piece (portion) of data and storing the computed hash function in a blockchain.

In one aspect, a system for preserving data using replication and blockchain notarization in accordance with the teachings of the present disclosure includes real-world devices, systems, components, and groups of components realized with the use of hardware such as integrated microcircuits (application-specific integrated circuit, ASIC) or field-programmable gate arrays (FPGA), or, for example, in the form of a combination of software and hardware such as a microprocessor system and set of program instructions, and also on neurosynaptic chips. The functionality of such system modules may be realized solely by hardware, and also in the form of a combination, where some of the functionality of the system modules is realized by software, and some by hardware. In certain aspects, some of the modules or all of the modules may be executed on the processor of a general-purpose computer (such as the one shown in FIG. 5). Furthermore, components of the system may be realized either within a single computing device or spread out among several interconnected computing devices.

Figure 1:
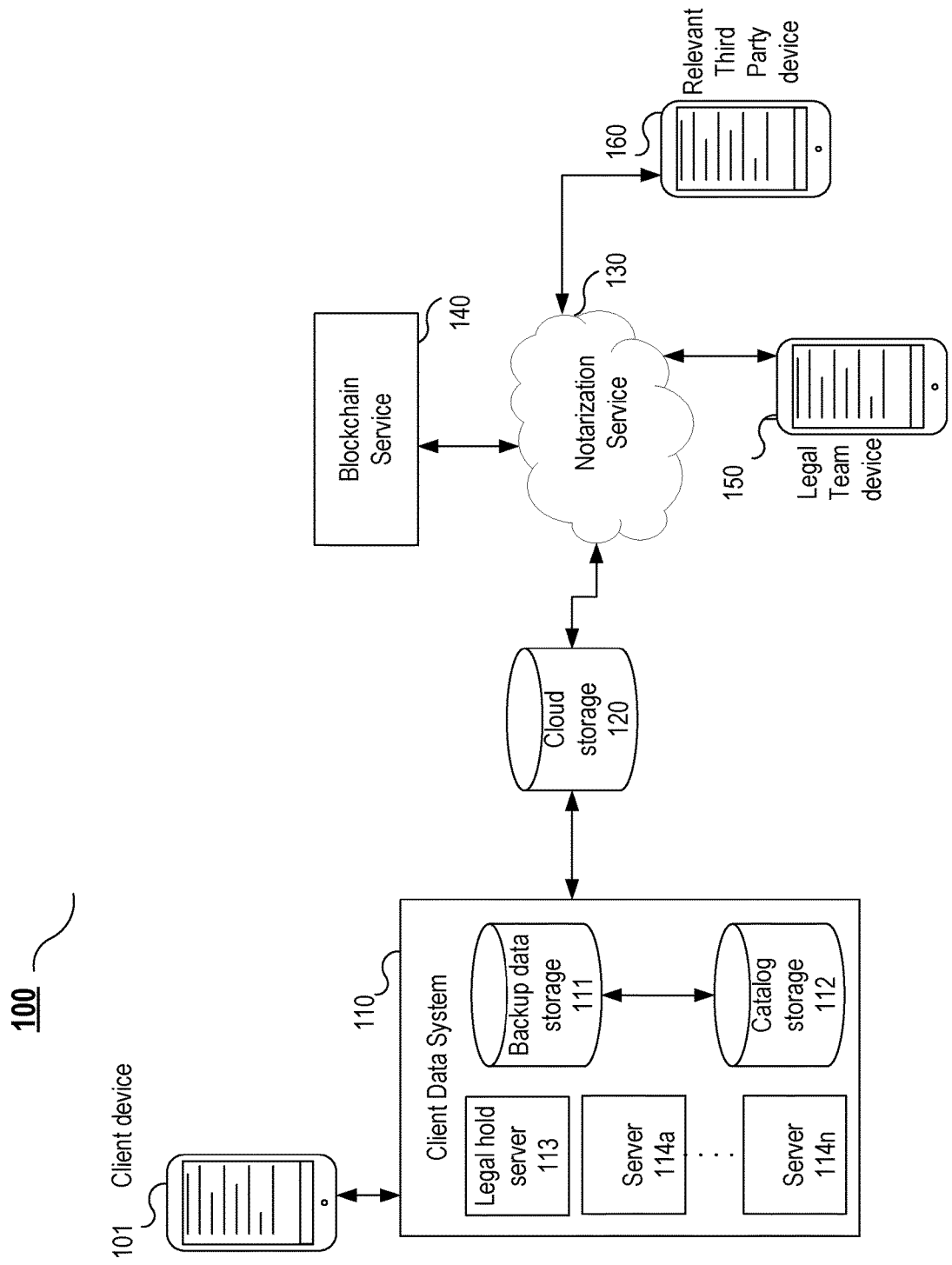
FIG. 1 is a block diagram illustrating an exemplary system for preserving data using replication and blockchain notarization in accordance with aspects of the present disclosure.

FIG. 1 is a block diagram illustrating an exemplary system 100 for preserving data using replication and blockchain notarization in accordance with aspects of the present disclosure. The system 100 for preserving data using a replication and blockchain notarization includes a client device 101, a client data system 110, cloud storage 120, a notarization service 130, a blockchain service 140, a legal team device 150, and a relevant third party device 160. The client device 101 is communicatively coupled to the client data system 110, the client data system 110 is communicatively coupled to the cloud storage 120, the cloud storage 120 is communicatively coupled to the notarization service 130, and the notarization service 130 is communicatively coupled to the blockchain service 140.

The client data system 110 comprises at least one backup data storage 111, a data catalog storage 112, a legal hold server 113, and any number of other servers 114a-114n.

Data generated by the client device 101 is stored at least in the backup data storage 111. Data catalog 112 contains indices, keywords, etc., that correspond to contents stored in the backup data storage 111. The legal hold server 113 of the present disclosure is used for implementing the method of the present disclosure for preserving data using replication and blockchain notarization, while guaranteeing data integrity.

The client device 101, legal team device 150, and the relevant third party device 160 may comprise any type of computing devices, such as a laptop computer, a desktop computer, a tablet, a mobile phone, and the like. Moreover, although only a single client device, a single legal team device, and a single third party device is shown in FIG. 1, the disclosed system 100 may be provided for any number of client, legal team or third party devices. Furthermore, it should be understood that each component of system 100 includes appropriate application program interfaces (APIs) needed for communicating with any other component of the system 100, as understood by those ordinarily skilled in the art.

As new data is generated by the client device 101, the contents of the data catalog 112 and the backup data storage 111 are updated (e.g., a backup client on client device 101 may automatically back up the new data based on, for example, a periodic schedule). When a query for retrieving data is received from a client device 101, the search in the backup data storage 111 may be conducted by first examining the data catalog 112 to identify which (if any) of the queried data was previously stored in the backup data storage 111.

In one aspect, the legal hold server 113 receives a request, from a user, e.g., the client 101, for a legal hold of data, and criteria for controlling access to the data. In response to the request, the legal hold server 113 creates a legal hold object for the data and establishes access control criteria.

Then, the legal hold server 113 creates, in the cloud storage 120, a cloud storage space that corresponds to the created legal hold object, and defines access control for reading from the created cloud storage space in accordance with the established access control criteria. For example, the defined access control may enable members of a legal team, relevant third parties, etc. to gain access to data stored in the created cloud storage space.

In one aspect, the legal hold server 113 searches, in a backup data storage 111, to identify all relevant data corresponding to the created legal hold object. For example, all the relevant data may be identified through faceted and full-text searches in the backup data storage 111 using the data catalog 112. In one aspect, the backup data storage 111 contains emails, cloud and local user data, etc.

In one aspect, the legal hold server 113 then replicates the identified relevant data in the created cloud storage space. In other words, the identified relevant data is saved in the created cloud storage space within the cloud storage 120.

In one aspect, the created cloud storage space may be in a neutral cloud storage 120. For example, the cloud storage may be a storage provided by a cloud storage service provider, such as Microsoft®, Amazon®, or any other storage service provider. Cloud storage service providers typically build the storage on an infrastructure that includes geographically distributed servers, thereby providing improved reliability. Creating the cloud storage space at the neutral cloud storage 120 makes the content physically inaccessible to anyone involved in the litigation proceedings. Thus, this approach has additional security benefits.

In order to simplify the identification of new relevant data, the legal hold server 113 also saves the search queries. The search query is saved to ensure that new relevant data is identified as it is being stored in the backup data storage 111.

Data stored in the cloud storage 120 is notarized via the blockchain service 140. In other words, the notarization service 130 utilizes the data integrity capabilities of the blockchain service 140. When the notarization service utilizes the blockchain, the notarization service may also be referred to as "a blockchain notarization" service.

The notarization service 130 enables a recipient of a copy of the data to prove that the copy of the data was exactly identical to the original data at a specific point of time. In order to provide a proof as to the copy of the data being identical to the original at the specific time, the notarization service provides a certificate to the recipient of the copy of the data. The certificate indicates that the copy of the data was identical to the original at the specific time. Note that each data (data item) is notarized individually. Therefore, a certificate is issued for each individual data item.

When new data is generated by the client device 101 and is stored in the backup data storage 111, the saved search query is checked to determine whether the newly generated data is relevant to any previously created legal hold objects. If the newly generated data is determined as being relevant for a legal hold object, the newly generated data is also preserved using the replication and blockchain notarization.

Note that only the newly generated data is uploaded to the cloud storage 120 and notarized. For example, the method of the present disclosure may compute the difference between the content (e.g., files, emails, etc.) of the backup data storage 111 at a previous time interval and the content of the backup data storage 111 at a current time interval. Content that is new may then be readily identified. The new content is then preserved. For example, the new content is replicated in the cloud storage 120, and notarized via the notarization service 130 and the blockchain service 140. Legal teams and relevant third parties may simply search for new items based on the history of changes—rather than receiving an entirely new complete copy of all the relevant data.

In one aspect, the method of the present disclosure maintains a history of all the changes to relevant data corresponding to the created legal hold object. In other words, all versions of each data item are maintained for the entire duration of the legal hold. Moreover, all of the versions are accessible. Note that the relevant data is retained in the cloud storage even if the original or backup data storage are removed.

In one aspect, an authentication procedure is established to ensure that the stored data is to be accessed in accordance with the established criteria. In another aspect, the stored data is to be accessed via devices previously registered as being authorized to read the data. For example, the legal team device 150, and a relevant third party device 160 may be pre-registered as being authorized.

The legal team device 150 and relevant third party device 160 access data stored in the cloud storage (e.g., obtain a copy of the data) in accordance with the access control criteria established by the client 101, and verify the integrity of the received copy of the data via the notarization service 130. In other words, members of the legal team and relevant third parties may read data from the cloud storage 120 in accordance with the established access control criteria. For example, the legal team device 150 may receive a copy of the stored data from the cloud storage 120. Then, the legal team device 150 verifies the integrity of the received copy of the stored data via a notarization service 130. If the verification is successful, the notarization service 130 issues a certificate to the legal team device 150 indicating that the copy obtained from the cloud storage 120 was identical to the original data, as of a specific time. Then, the user of the legal team device 150 is able to prove that the copy of the stored data is identical to the original data as of the specific time. In other words, no alteration of the data occurred between the time at which the data was originally stored and the time at which the copy was verified via the notarization service 130.

In one aspect, the notarization certificate is sent to the recipient of the copy automatically. In other words, the recipient does not need to send a request to receive the certificate.

In an optional aspect, the notarization certificate is sent to a list of pre-defined receivers, e.g., pre-defined list of legal team members, pre-defined list of relevant third parties, etc. All of the parties with access to the cloud storage are able to view or download the data items, the history of all the changes, and the notarization certificates of each of the data items (per version, in amended).

Figure 2:
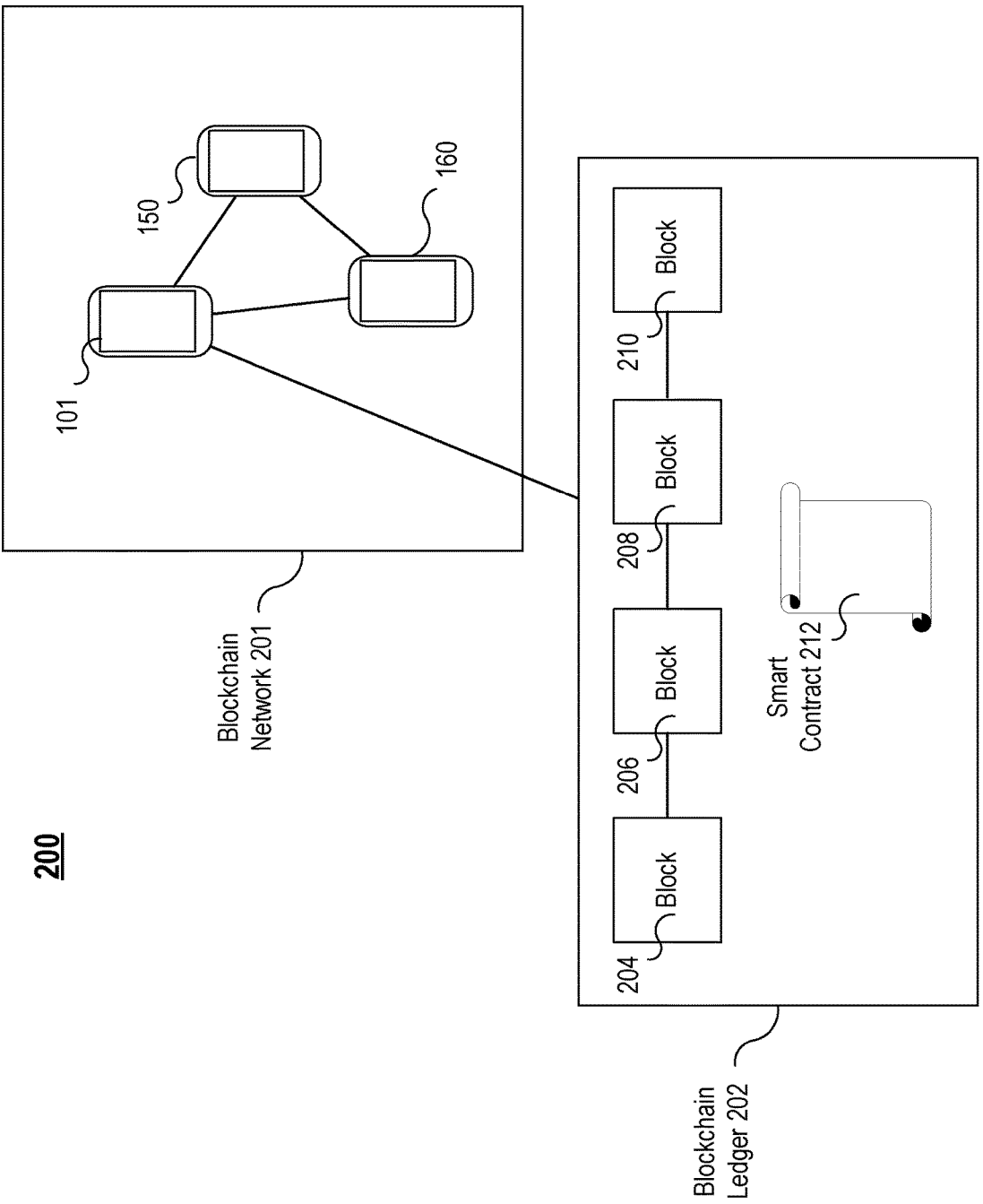
FIG. 2 is a block diagram illustrating an exemplary system for preserving data using blockchain notarization in accordance with aspects of the present disclosure.

FIG. 2 is a block diagram illustrating exemplary system 200 for preserving data using blockchain notarization in accordance with aspects of the present disclosure. In some aspects, blockchain service 140 refers to an alternate/additional verification method/system 200 that can be used.

In system 200, client device 101, legal team device 150, and relevant third party device 160 may be comprised in blockchain network 201. For simplicity only three devices are shown in network 201, but several client devices, legal devices, and third party devices may be a part of network 201. Each device in network 201 may store a copy of blockchain ledger 202. In system 200, ledger 202 comprises four blocks 204, 206, 208, and 210, and smart contract 212. Network 201 may be a private blockchain network. Unlike a public blockchain (e.g., Bitcoin), a private blockchain is permissioned and restricts the entities that can actually join the network. Accordingly, the litigation matters associated with the parties involved in the litigation are kept confidential.

Blocks 204, 206, 208, and 210 may represent the identified relevant data associated with a particular legal hold object. For example, the legal hold object may be associated with all electronic documents that include a particular term. The relevant data is thus a plurality of documents (e.g., Word documents, emails, texts, etc. on client device 101) that include that particular term. The initial block of blockchain ledger 202, namely block 204, may comprise the plurality of documents or a representation of the plurality of documents (e.g., a hash value). Over the course of the litigation, these documents may change, new documents may be discovered, or documents may be removed. These additions, modifications, and deletions are captured as transactions and recorded in the subsequent blocks.

However, before recording the transactions, the transactions may be run against smart contract 212. Smart contract 212 may comprise various criteria that need to be satisfied before a new block can be added to ledger 202. For example, smart contract 212 may assess whether the requestor (e.g., client device 101) of the transaction has the permissions to remove/modify data, whether a particular new file or modification has been notarized by notarization service 130, etc. If the criteria are satisfied, the transaction is recorded in a new block and ledger 202 is updated across network 201. A benefit of this setup is that if a malicious party (e.g., client device 101) attempts to change a block of ledger 202 to tamper with the litigation proceedings, the other devices will recognize that the change is improper and can block it.

Figure 3:
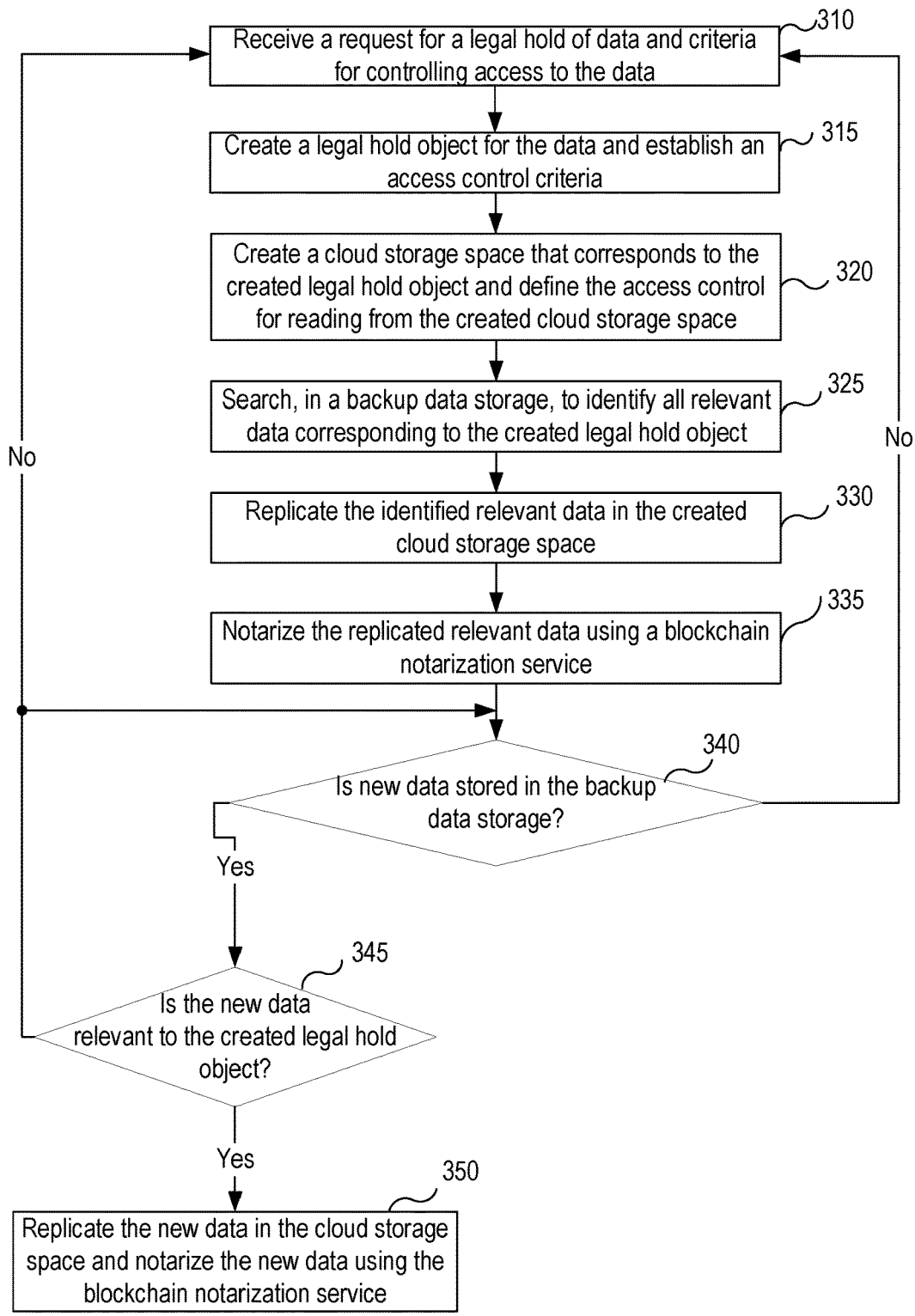
FIG. 3 is a flow diagram illustrating an exemplary method of a client system for preserving data using a replication and blockchain notarization in accordance with aspects of the present disclosure.

FIG. 3 is a flow diagram illustrating an exemplary method 300 of a client system for preserving data using a replication and blockchain notarization in accordance with aspects of the present disclosure.

In step 310, method 300 receives, from a user, a request for a legal hold of data and criteria for controlling access to the data. For example, suppose a litigation is expected for a particular case involving the user. Then, the user of the client device 101 may send a request to the legal hold server 113 requesting for a legal hold of data regarding the particular case and criteria for controlling access to the data (items of the data) that is to be in legal hold. The criteria may specify access criteria, e.g., by the members of the legal team and other third parties. The legal hold server 113 is used to implement the method of the present disclosure such that the client data system is able to invoke a process for identifying all relevant data related to the particular case, collecting the identified relevant data, preserving the collected relevant data, etc. Moreover, once the data is gathered and preserved, those that satisfy the access criteria may receive a copy of the relevant data, and verify its authenticity. As such, the method of the present disclosure also provides a blockchain notarization service which notarizes data items placed in cloud storage and verifies the authenticity of copies of data received by various authorized entities.

In step 315, method 300 creates a legal hold object for the data and establishing an access control criteria. The access control criteria is established based on the criteria controlling access to the data received from the user in step 310.

In step 320, method 300 creates, in the cloud storage, a cloud storage space that corresponds to the created legal hold object, and defining the access control for reading from the created cloud storage space in accordance with the established access control criteria. For example, the cloud storage space may be created via a cloud storage service, such as provided by data storage service provider.

In step 325, method 300 searches, in a backup data storage of a client data system, to identify all relevant data corresponding to the created legal hold object, and storing the identified relevant data and the search queries used for the identification of the relevant data.

In step 330, method 300 replicates the identified relevant data in the created cloud storage space. For example, the identified relevant data (each item) is replicated in the cloud storage space created in step 320.

In step 335, method 300 notarizes the replicated relevant data using a blockchain notarization service.

In optional step 340, method 300 determines whether new data is stored in the backup data storage. If new data is stored in the backup data storage, method 300 proceeds to step 345, otherwise, the method returns to step 310.

In optional step 345, when new data is stored in the backup data storage, method 300 determines whether the new data is relevant to the created legal hold object using the stored search query. If the new data is not relevant to the created legal hold object, the method proceeds to steps 310 and 340. Otherwise, the method proceeds to step 350.

In optional step 350, when the new data is determined as being relevant for the legal hold object, the method replicates the new data that is relevant in the created cloud storage space, and notarizes the new data that is relevant using the blockchain notarization service. Then, the method proceeds to steps 310 and 340.

In one aspect, the notarized relevant data is read from the created cloud storage space by one or more users in accordance with the defined access control, and the blockchain notarization service is used to verify an integrity of the data read from the created cloud storage space.

In one aspect, the blockchain notarization service is further used to transmit a notarization certificate to a pre-defined list of recipients of a copy of the relevant data, wherein the transmission of the notarization certificate being in compliance with the defined access control.

In one aspect, the notarization certificate is issued for each data item, separately.

In one aspect, the identified relevant data, after being replicated and notarized, is retained in the created cloud storage space for a duration of the legal hold.

In one aspect, the notarization of the replicated relevant data occurs automatically upon the replication of the identified relevant data in the created cloud storage space.

As described above, the present disclosure describes systems and methods for preserving data using a replication and blockchain notarization. One advantage of the method of the present disclosure is allowing recipients of copies of the preserved data to prove that the copy was notarized as being identical to the original as of a given data (the date of the certification).

Figure 4:
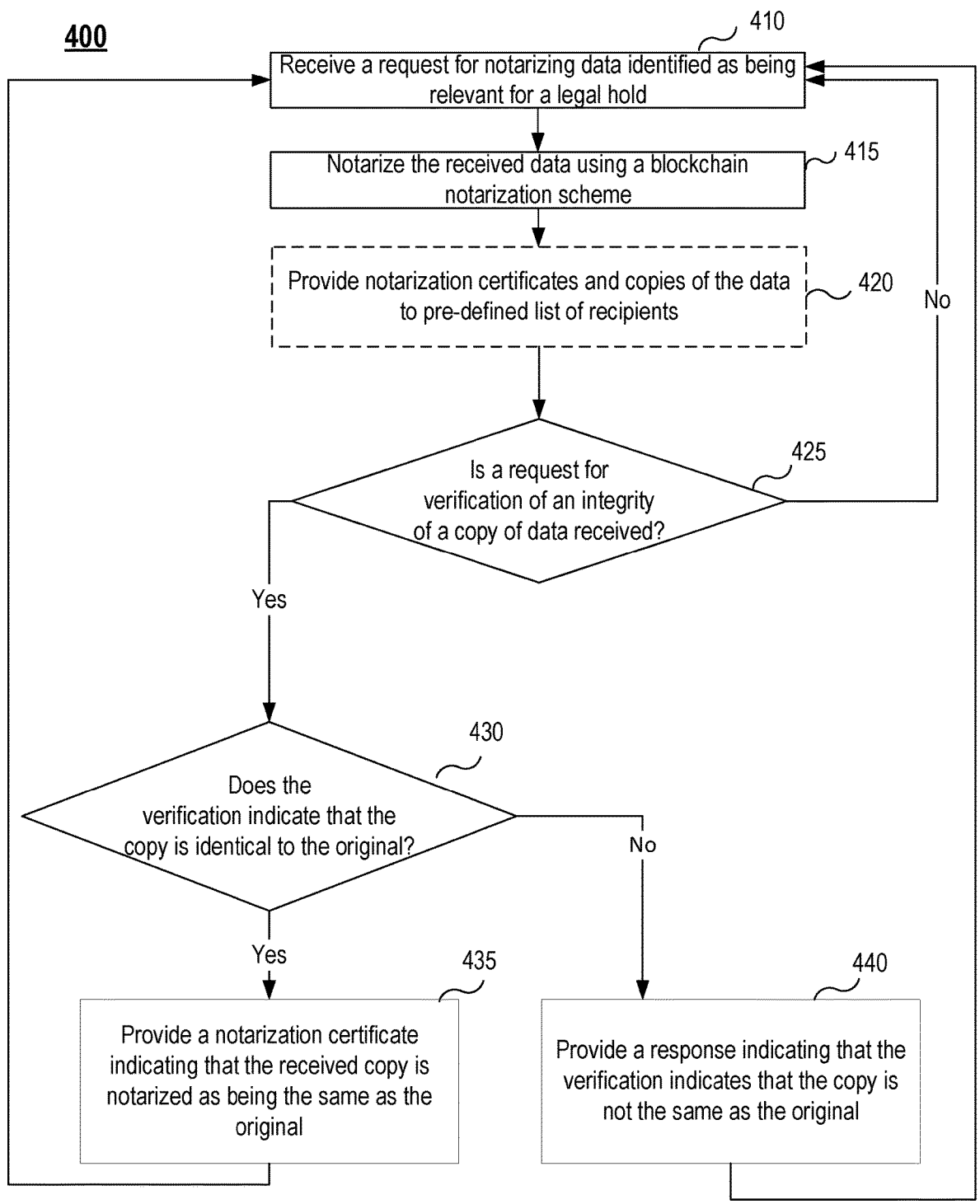
FIG. 4 is a flow diagram illustrating an exemplary method of a notarization service for preserving data using a replication and blockchain notarization in accordance with aspects of the present disclosure.

FIG. 4 is a flow diagram illustrating an exemplary method 400 of a notarization service for preserving data using a replication and blockchain notarization in accordance with aspects of the present disclosure.

In step 410, method 400 receives, from a cloud storage service, a request for notarizing data identified as being relevant for a legal hold.

In step 415, method 400 notarizes the data using a blockchain notarization scheme.

In optional step 420, method 400 provides notarization certificates and copies of the data to pre-defined list of recipients.

In step 425, determines whether a request for verification of an integrity of a copy of data is received. If no verification request is received, the method returns to step 410. Otherwise, the method proceeds to step 430.

In step 430, method 400 verifies the integrity of the received copy of data. For example, the method compares the received copy against an original copy that was previously blockchain notarized. If the verification indicates that the received copy is identical to the original, the method proceeds to step 435. Otherwise, the method proceeds to step 440.

In step 435, method 400 provides a notarization certificate indicating that the received copy is notarized as being the same as the original. The recipient of the copy and notarization certificate is then able to prove the authenticity of the copy during the legal proceedings.

In step 440, method 400 provides a response indicating that the verification indicates that the copy is not the same as the original. The method then returns to step 410.

Figure 5:
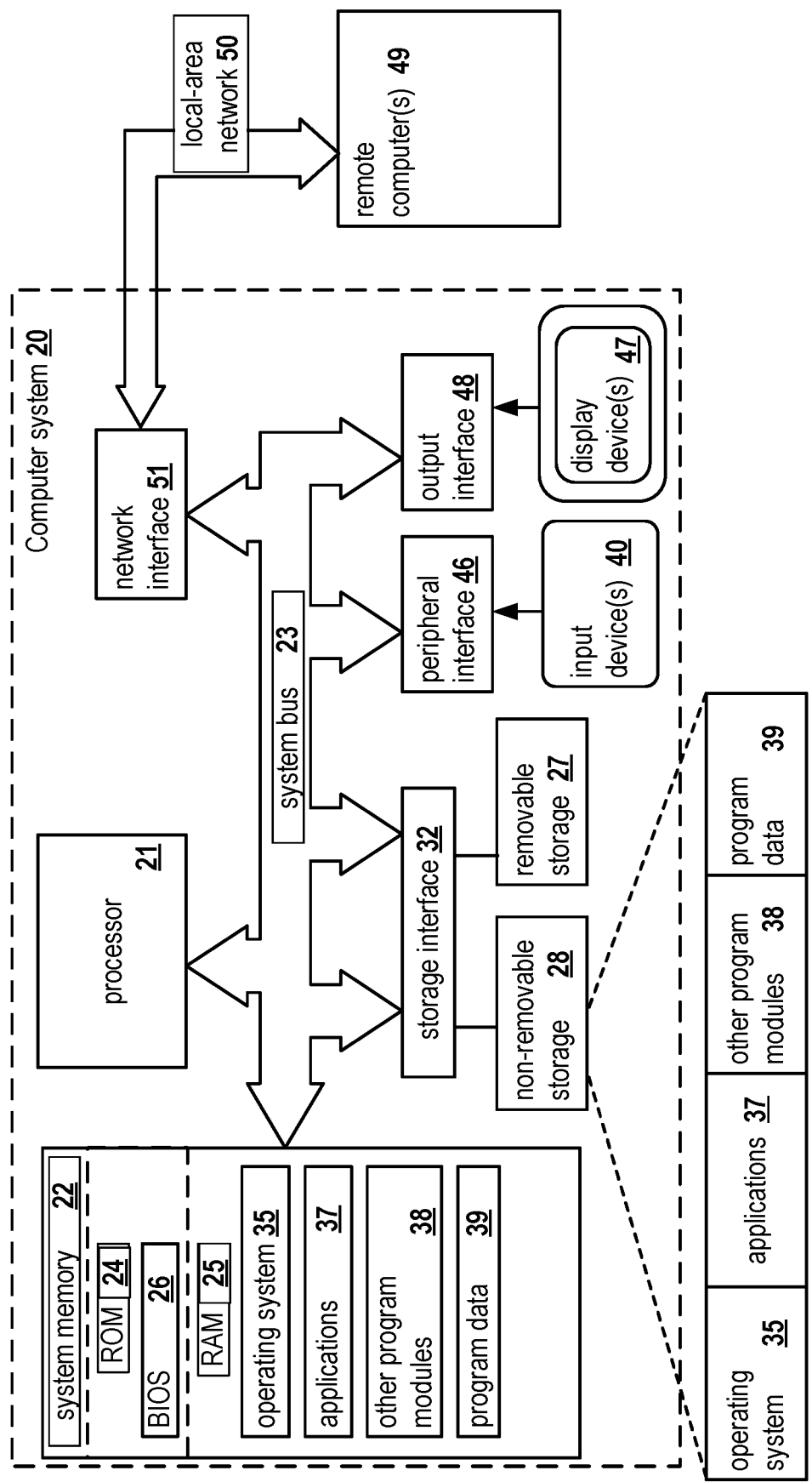
FIG. 5 presents an example of a general-purpose computer system on which aspects of the present disclosure can be implemented.

FIG. 5 is a block diagram illustrating a computer system 20 on which aspects of systems and methods for preserving data using a replication and blockchain notarization may be implemented, for example, using a client data system 110, a cloud storage 120, a notarization service 130, and a blockchain service 140, in accordance with an exemplary aspect.

It should be noted that the computer system 20 can correspond to a virtual machine on a computing device, for example, as described earlier the intercepting module may be deployed on a virtual machine. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for preserving data using a replication and blockchain notarization, the method comprising:
receiving, from a user, a request for a legal hold of data and criteria for controlling access to the data;
creating a legal hold object for the data and establishing an access control criteria;
creating, in cloud storage, a cloud storage space that corresponds to the created legal hold object, and defining access control for reading from the created cloud storage space in accordance with the established access control criteria;

搜 searching, in a backup data storage, to identify all relevant data corresponding to the created legal hold object, and storing, in the backup data storage, the identified relevant data and search queries used for identification of the relevant data;

replicating the identified relevant data in the created cloud storage space; and notarizing the replicated relevant data using a blockchain notarization service.

2. The method of claim 1, wherein the notarized relevant data is read from the created cloud storage space by one or more users in accordance with the defined access control, and the blockchain notarization service is used to verify an integrity of the data read from the created cloud storage space.

3. The method of claim 1, wherein the blockchain notarization service is further used to transmit a notarization certificate to a pre-defined list of recipients of a copy of the relevant data, the transmission of the notarization certificate being in compliance with the defined access control.

4. The method of claim 3, wherein the notarization certificate is issued for each data item, separately.

5. The method of claim 1, wherein the identified relevant data, after being replicated and notarized, is retained in the created cloud storage space for a duration of the legal hold.

6. The method of claim 1, wherein the notarization of the replicated relevant data occurs automatically upon the replication of the identified relevant data in the created cloud storage space.

7. The method of claim 1, further comprising:
determining when new data is stored in the backup data storage;
using the stored search query to determine whether the new data is relevant to the created legal hold object;
when the new data is determined as being relevant for the legal hold object, replicating the new data that is relevant in the created cloud storage space; and
notarizing the new data that is relevant using the blockchain notarization service.

8. A system for preserving data using a replication and blockchain notarization, comprising:
at least one hardware processor configured to:
receive, from a user, a request for a legal hold of data and criteria for controlling access to the data;
create a legal hold object for the data and establish an access control criteria;
create, in cloud storage, a cloud storage space that corresponds to the created legal hold object, and define access control for reading from the created cloud storage space in accordance with the established access control criteria;
search, in a backup data storage, to identify all relevant data corresponding to the created legal hold object, and store, in the backup data storage, the identified relevant data and search queries used for identification of the relevant data;
replicate the identified relevant data in the created cloud storage space; and
notarize the replicated relevant data using a blockchain notarization service.

9. The system of claim 8, wherein the notarized relevant data is read from the created cloud storage space by one or more users in accordance with the defined access control, and the blockchain notarization service is used to verify an integrity of the data read from the created cloud storage space.

10. The system of claim 8, wherein the blockchain notarization service is further used to transmit a notarization certificate to a pre-defined list of recipients of a copy of the relevant data, the transmission of the notarization certificate being in compliance with the defined access control.

11. The system of claim 10, wherein the notarization certificate is issued for each data item, separately.

12. The system of claim 8, wherein the identified relevant data, after being replicated and notarized, is retained in the created cloud storage space for a duration of the legal hold.

13. The system of claim 8, wherein the notarization of the replicated relevant data occurs automatically upon the replication of the identified relevant data in the created cloud storage space.

14. The system of claim 8, wherein the hardware processor is further configured to:
determine when new data is stored in the backup data storage;
use the stored search query to determine whether the new data is relevant to the created legal hold object;
when the new data is determined as being relevant for the legal hold object, replicate the new data that is relevant in the created cloud storage space; and
notarize the new data that is relevant using the blockchain notarization service.

15. A non-transitory computer readable medium storing thereon computer executable instructions for preserving data using a replication and blockchain notarization, including instructions for:
receiving, from a user, a request for a legal hold of data and criteria for controlling access to the data;
creating a legal hold object for the data and establishing an access control criteria;
creating, in cloud storage, a cloud storage space that corresponds to the created legal hold object, and defining access control for reading from the created cloud storage space in accordance with the established access control criteria;
searching, in a backup data storage, to identify all relevant data corresponding to the created legal hold object, and storing, in the backup data storage, the identified relevant data and search queries used for identification of the relevant data;
replicating the identified relevant data in the created cloud storage space; and
notarizing the replicated relevant data using a blockchain notarization service.

16. The non-transitory computer readable medium of claim 15, wherein the notarized relevant data is read from the created cloud storage space by one or more users in accordance with the defined access control, and the blockchain notarization service is used to verify an integrity of the data read from the created cloud storage space.

17. The non-transitory computer readable medium of claim 15, wherein the blockchain notarization service is further used to transmit a notarization certificate to a pre-defined list of recipients of a copy of the relevant data, the transmission of the notarization certificate being in compliance with the defined access control.

18. The non-transitory computer readable medium of claim 17, wherein the notarization certificate is issued for each data item, separately.

19. The non-transitory computer readable medium of claim 15, wherein the identified relevant data, after being replicated and notarized, is retained in the created cloud storage space for a duration of the legal hold.

20. The non-transitory computer readable medium of claim 15, wherein the notarization of the replicated relevant data occurs automatically upon the replication of the identified relevant data in the created cloud storage space.

21. The non-transitory computer readable medium of claim 15, the instructions further comprising instructions for:
   determining when new data is stored in the backup data storage;
   using the stored search query to determine whether the new data is relevant to the created legal hold object;
   when the new data is determined as being relevant for the legal hold object, replicating the new data that is relevant in the created cloud storage space; and
   notarizing the new data that is relevant using the blockchain notarization service.

\* \* \* \* \*